United States Patent
Horiuchi

(10) Patent No.: US 7,193,859 B2
(45) Date of Patent: Mar. 20, 2007

(54) CABINET FOR TELEVISION SET AND CABINET FOR ELECTRIC APPARATUS

(75) Inventor: Yasuo Horiuchi, Daito (JP)

(73) Assignee: Funai Electric Co., Ltd., Daito (JP)

(*) Notice: Subject to any disclaimer, the term of this patent is extended or adjusted under 35 U.S.C. 154(b) by 440 days.

(21) Appl. No.: 10/927,366

(22) Filed: Aug. 26, 2004

(65) Prior Publication Data

US 2005/0082952 A1 Apr. 21, 2005

(30) Foreign Application Priority Data

Aug. 29, 2003 (JP) .............................. 2003-306986

(51) Int. Cl.
*H05K 7/14* (2006.01)
*H04N 5/64* (2006.01)
*A47B 81/06* (2006.01)

(52) U.S. Cl. ................ 361/756; 361/807; 361/814; 361/758; 361/742; 361/804; 348/836; 312/7.2

(58) Field of Classification Search ........ 361/681–683, 361/752, 814, 804, 807, 808, 742, 758; 348/825, 348/836, 838, 839; 312/7.2; 248/817
See application file for complete search history.

(56) References Cited

U.S. PATENT DOCUMENTS

| | | | | | |
|---|---|---|---|---|---|
| 5,041,944 | A | * | 8/1991 | Campisi | 361/682 |
| 5,414,593 | A | * | 5/1995 | Furlan | 361/784 |
| 5,575,545 | A | * | 11/1996 | Wang | 312/7.2 |
| 5,629,745 | A | * | 5/1997 | Naito et al. | 348/836 |
| 5,999,233 | A | * | 12/1999 | Park | 348/836 |
| 6,034,745 | A | * | 3/2000 | Cho | 348/836 |
| 6,046,783 | A | * | 4/2000 | Park | 348/836 |
| 6,695,417 | B2 | * | 2/2004 | Maruta | 312/7.2 |

* cited by examiner

*Primary Examiner*—Tuan Dinh
*Assistant Examiner*—Dameon E. Levi
(74) *Attorney, Agent, or Firm*—Peter Canjian

(57) ABSTRACT

A cabinet (10) for a television set or an electric apparatus includes a casing having a front wall (11) and a bottom wall (12), a key top (13), guide structures (20a, 20c, 20b) for holding a narrow first printed wiring board (30) provided with a tact switch (30a) and a wide second printed wiring board (130) provided with a tact switch (1301) at different levels, respectively. Either of the first printed wiring board (30) or the second printed wiring board (130) can be held in the casing without changing the design of the cabinet (10).

9 Claims, 5 Drawing Sheets

CABINET FOR TELEVISION SET AND CABINET FOR ELECTRIC APPARATUS

BACKGROUND OF THE INVENTION

1. Field of the Invention

The present invention relates to a cabinet for a television set, and a cabinet for an electric apparatus. More particularly, the present invention relates to a cabinet for a television set, having a front wall provided with a key top, and a cabinet for an electric apparatus, having a front wall provided with a key top.

2. Description of the Related Art

Each of cabinets of this kind for television sets and electric apparatuses such as disclosed in JP-Z No. 3068461 (FIG. 1 in Reference 1) is provided with several sets of rails respectively having different rail spaces to guide printed wiring boards. A cabinet disclosed in JP-A No. 2000-183567 (Reference 2) is provided with several printed wiring board holding structures formed respectively at different heights.

The design of the cabinet mentioned in Reference 1 does not need to be changed even if the width of an end part of the printed wiring board is changed. The design of the cabinet mentioned in Reference 2 does not need to be changed even if the width of the printed wiring board is changed provided that the cabinet is provided with the wiring board holding structures meeting the different sizes of printed wiring boards and formed respectively at different heights.

The sets of rails of the cabinet mentioned in Reference 1 are formed at the same height. Therefore, the set of rails spaced at a narrow interval obstructs inserting a wide printed wiring board. In other words, only a printed wiring board having a width narrower than the narrowest space between the rails or only a part of a printed wiring board can be inserted in a front part. In the cabinet mentioned in Reference 2, the height at which a printed wiring board is held changes when the size of the printed wiring board is changed. Accordingly, if the printed wiring board is provided with a tact switch, the design of a key top for pressing the tact switch needs to be changed according to the height at which the printed wiring board is held. Thus, although the design of the printed wiring board holding structures does not need to be changed even if the size of the printed wiring board is changed, the design of the cabinet including the key top unavoidably needs to be changed because the height of the tact switch changes.

SUMMARY OF THE INVENTION

The present invention has been made in view of the foregoing problems and it is therefore an object of the present invention to provide cabinets, respectively for a television set and an electric apparatus, capable of holding one of printed wiring boards of different sizes without changing its design.

A cabinet in a first aspect of the present invention for a television set having a picture tube includes: a casing housing the picture tube therein and having a bottom wall, and a front wall provided with an opening through which a display screen included in the picture tube is exposed; a key top placed on the front wall at a position below the screen of the picture tube; and a printed wiring board holding structure for holding first and second printed wiring boards, each provided with a tact switch capable of being pressed by the key top, in the casing substantially parallel to the bottom wall of the casing, including two first guide structures spaced a first distance apart from each other, and including two rectangular first ribs standing on the bottom wall and extending substantially perpendicularly to a lateral direction, and two substantially U-shaped first rails formed integrally with the two first ribs, respectively, defining first grooves opening toward each other and receiving side parts of the first printed wiring board of a predetermined first width therein and capable of guiding the first printed wiring board and of holding the first printed wiring board at a predetermined first height from the bottom wall, and two second guide structures spaced a second distance apart from each other, and including two rectangular second ribs standing on the bottom wall and extending perpendicularly to the lateral direction, and two substantially U-shaped second rails formed integrally with the second ribs, respectively, defining second grooves opening toward each other and receiving side parts of the second printed wiring board of a predetermined second width therein; and a reinforcing rib formed at a position between the two first guide structures to support the first printed wiring board held by the first guide structures thereon; wherein one of the two second ribs is formed integrally with one of the two first ribs, the other second rib is formed on the laterally outer side of the other first rib, the second height is higher than the first height, the key top has two opposite depressing plates extending backward, respectively having thin contact parts of a predetermined length formed by reducing the thickness of end parts thereof, facing the thin tact switches of the first and the second printed wiring boards, respectively, and capable of depressing the tact switches when the key top is tilted relative to the front wall.

In the cabinet for a television set in the first aspect of the present invention, the display screen of the picture tube held in an upper part of the front wall is exposed. The key top is placed on the front wall at a position below the picture tube. The printed wiring board is held in the cabinet substantially parallel to the bottom wall of the cabinet, and the printed wiring board is provided with the tact switch that can be pressed by the key top.

The two first guide structures include the two rectangular first ribs standing on the bottom wall and extending substantially perpendicularly to the lateral direction and the two substantially U-shaped first rails formed on the two first ribs, defining grooves opening toward each other and capable of receiving the side parts of the first printed wiring board, and of guiding the first printed wiring board. The two first guide structures hold the first printed wiring board at a predetermined first height from the bottom wall.

Similarly, the two second guide structures include the two rectangular second ribs standing on the bottom wall and extending perpendicularly to the lateral direction and the two substantially U-shaped second rails formed on the two second ribs, defining the grooves opening toward each other and capable of receiving the side parts of the second printed wiring board. The two second guide structures guide the second printed wiring board and hold the second printed wiring board at a second height from the bottom wall higher than the first height at which the two first guide structures hold the first printed wiring board. Since the second printed wiring board held by the second guide structures is at the second height from the bottom wall higher than the first height at which the two first guide structures holds the first printed wiring board, the second printed wiring board held by the two second guide structures does not interfere with the two first guide structures.

One of the rectangular second ribs standing on the bottom wall and extending perpendicularly to the lateral direction is formed integrally with one of the two first ribs. One of the two first rails and one of the second rails are formed on the first rib formed integrally with one of the second rib. Thus, actually, only one of the two second ribs is necessary and hence the construction of the cabinet for a television set can be simplified. Since the distance between the two second guide structures may be longer than or equal to that between the two first guide structures, the second printed wiring board held by the two second guide structures may have a width greater than or equal to that of the first printed wiring board held by the two first guide structures. Thus either of the two types of printed wiring board can be held in the cabinet for a television set without changing the design of the cabinet.

The key top has the two opposite depressing plates extending backward and respectively having the thin contact parts of a predetermined length. The contact part of one of the two pressing plates faces the thin tact switch of the first printed wiring board held by the two first guide structures, and the contact part of the other pressing plate faces the thin tact switch of the second printed wiring board held by the second guide structures. The key top can be tilted relative to the front panel. The contact parts of the key top can be pressed against the tact switches when the key top is tilted.

The reinforcing rib supporting the first printed wiring board held by the two first guide structures thereon prevents the first printed wiring board from being downward convexly warped when the tact switch of the first printed wiring board is depressed, so that pressure can be surely applied to the tact switch.

The tact switch can be pressed without requiring any change in the design of the cabinet for a television set when the printed wiring board is held by either of the two first guide structures or the two second guide structures. Since the contact parts of the key top are thin, and the tact switches are thin, the printed wiring boards do not interfere with the contact parts even if the gap between the printed wiring boards held respectively by the two first guide structures and the two second guide structures is narrow. Thus the present invention is effective when only a narrow space of a short height is available for arranging printed wiring board under a picture tube in a cabinet.

A cabinet in a second aspect of the present invention for an electric apparatus includes: a casing having a front wall and a bottom wall; a key top placed on the front wall; and a printed wiring board holding structure for holding first and second printed wiring boards, each provided with a tact switch capable of being pressed by the key top, substantially parallel to the bottom wall of the casing in the casing, including two first guide structures supporting side parts of the first printed wiring board of a predetermined first width thereon, and capable of guiding the first printed wiring board and of holding the same at a predetermined first height from the bottom wall, and two second guide structures supporting side parts of the second printed wiring board of a predetermined second width thereon at a second height from the bottom wall; wherein the key top is capable of pressing the tact switches of the first and the second printed wiring board held by the first and the second guide structure, respectively.

In the cabinet in the second aspect of the present invention, the key top is supported on the front wall. The printed wiring boards of the electric apparatus are held substantially parallel to the bottom wall of the cabinet in the cabinet. The printed wiring boards are provided with the tact switches that can be pressed by the key top.

The two first guide structures are formed so as to correspond to the side parts of the printed wiring board of a predetermined width, guides the printed wiring board and holds the printed wiring board at a predetermined height from the bottom wall. Similarly, the two second guide structures formed at positions laterally outside the two first guide structures or at the same position as the two first guide structures so as to correspond to the side parts of the printed wiring board of a predetermined width, guides the printed wiring board and holds the printed wiring board at a predetermined height from the bottom wall. Since the printed wiring board held by the two second guide structures is at a height from the bottom wall higher than that of the two first guide structures, the same printed wiring board will not interfere with the two first guide structures. Since the two second guide structures are formed at positions laterally outside the two first guide structures or at the same positions as the two first guide structures, the width of the printed wiring board held by the two second guide structures is equal to or greater than that of the printed wiring board held by the two first guide structures. Thus the cabinet for an electric apparatus is able to hold two printed wiring boards respectively having different widths without changing its design.

The key top is capable of pressing the respective tact switches of the printed wiring boards respectively held by the two first guide structures and the two second guide structures. The tact switch of a printed wiring board can be pressed without changing the design of the cabinet for an electric apparatus when the printed wiring board is held by either of the two first guide structures or the two second guide structure.

In the cabinet according to the present invention, the key top has two opposite depressing plates extending backward and respectively having contact parts facing the tact switches of the printed wiring boards held by the two first guide structures and the two second guide structures, and is capable of depressing the tact switches when tilted relative to the front wall.

Thus the key top has the two depressing plates extending backward and respectively having contact parts. The contact part of one of the depressing plates is positioned opposite to the tact switch of the printed wiring board held by the two first guide structures, and the contact part of the other depressing plate is positioned opposite to the tact switch of the printed wiring board held by the two second guide structures. The key top is capable of being tilted relative to the front wall. When the key top is tilted, the contact parts are displaced and thereby the tact switches are pressed.

In the cabinet according to the present invention, the contact part of each of the depressing plates is formed by reducing the thickness of an end part of a predetermined length of the depressing plate. The thin parts of the depressing plates will not interfere with the printed wiring boards. Consequently, the vertical interval between the printed wiring boards held by the two first guide structures and the two second guide structures may be short. Since only the end parts of the depressing plates are formed in a small thickness, the depressing plates have sufficient rigidity. Thus unreliable pressing of the tact switches due to the bending of the depressing plates can be prevented.

In the cabinet according to the present invention, the tact switches are thin. Since the tact switches are thin, the printed wiring boards can be held at short interval by the two first guide structures and the two second guide structures, respectively.

In the cabinet according to the present invention, the two first guide structures include two rectangular first ribs standing on the bottom wall and extending substantially perpendicularly to a lateral direction, and two substantially U-shaped first rails formed on the two first ribs, respectively, defining grooves opening toward each other and receiving side parts of the printed wiring board, and the two second guide structures include two rectangular second ribs standing on the bottom wall and extending perpendicularly to the lateral direction, and two substantially U-shaped second rails formed on the two second ribs, respectively, defining grooves opening toward each other and receiving side parts of the printed wiring board.

The two first guide structures include the two rectangular first ribs standing on the bottom wall and extending substantially perpendicularly to a lateral direction, and the two second guide structures include the two rectangular second ribs standing on the bottom wall and extending perpendicularly to the lateral direction. The two first guide structures have the two substantially U-shaped first rails defining the grooves opening toward each other and receiving side parts of the printed wiring board, respectively, and the two second guide structures have the two substantially U-shaped second rails defining the grooves opening toward each other and receiving side parts of the printed wiring board, respectively. Thus the printed wiring board can be held at predetermined heights, respectively, from the bottom wall.

In the cabinet according to the present invention, one of the two second ribs is formed integrally with one of the two first ribs. Since one of the two second ribs is formed integrally with one of the two first ribs, the cabinet has simple construction.

In the cabinet according to the present invention, a reinforcing rib is formed between the two first guide structures on the bottom wall to support the printed wiring board held by the two first guide structures. Since the reinforcing rib supports the printed wiring board. The printed wiring board held by the two first guide structures will not be warped downward convexly when the tact switch thereof is depressed and hence the tact switch can be surely pressed.

In the cabinet according to the present invention, one of the two first guide structures is provided at its top with protrusions for supporting the second printed wiring board held by the two second guide structures. Thus the printed wiring board held by the two second guide structures is supported on the protrusions and thereby the second printed wiring board held by the two second guide structures is prevented from downward convex warping when the tact switch thereof is pressed. Since the distance between the two second guide structures is longer than that between the two first guide structures, any special members for forming the protrusions thereon do not need to be disposed between the two second guide structures and hence the cabinet for an electric apparatus has simple construction.

The design of the cabinet according to the present invention for a television set does not need to be changed even if the width of the printed wiring board is changed.

The design of the cabinet according to the present invention for an electric apparatus does not need to be changed even if the width of the printed wiring board is changed.

The design of the key top of the cabinet according to the present invention does not need to be changed even if the width of the printed wiring board is changed.

According to the present invention, the printed wiring boards can be vertically spaced apart, and the tact switches can be surely pressed.

According to the present invention, the printed wiring boards can be held by simple holding structures.

The cabinet according to the present invention has simple construction.

According to the present invention, the tact switches can be surely pressed.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A cabinet in a preferred embodiment according to the present invention for a television set will be described with reference to the accompanying drawings.

Construction of the Cabinet

Figure 1:
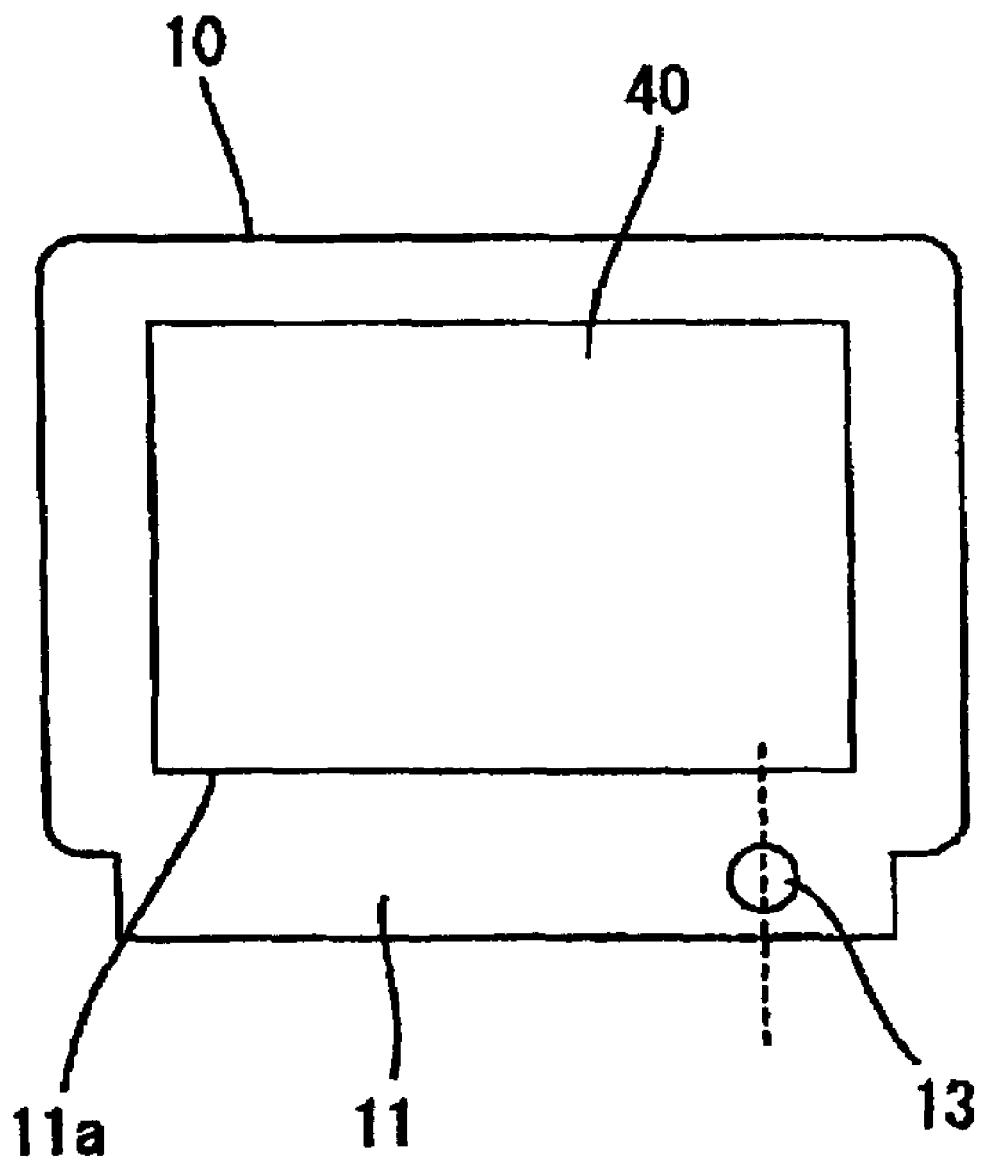
FIG. 1 is a front elevation of a cabinet in a preferred embodiment according to the present invention for a television set.

Referring to FIG. 1 showing a cabinet 10 in a preferred embodiment according to the present invention in a front elevation, the cabinet 10 has a front wall 11 provided with an opening 11a. An image tube 40 is disposed in a casing included in the cabinet 10 with its display screen held in the opening 11a. A key top 13 having a substantially circular, forward convex head for closing and opening a main switch included in the television set and connected to a power source is held on the front wall 11 at a position below the image tube 40.

Images displayed on the display screen of the image tubes 40 can be watched from a position in front of the image tube 40. The main switch of the television set can be closed and opened by pushing the key top 13.

Figure 2:
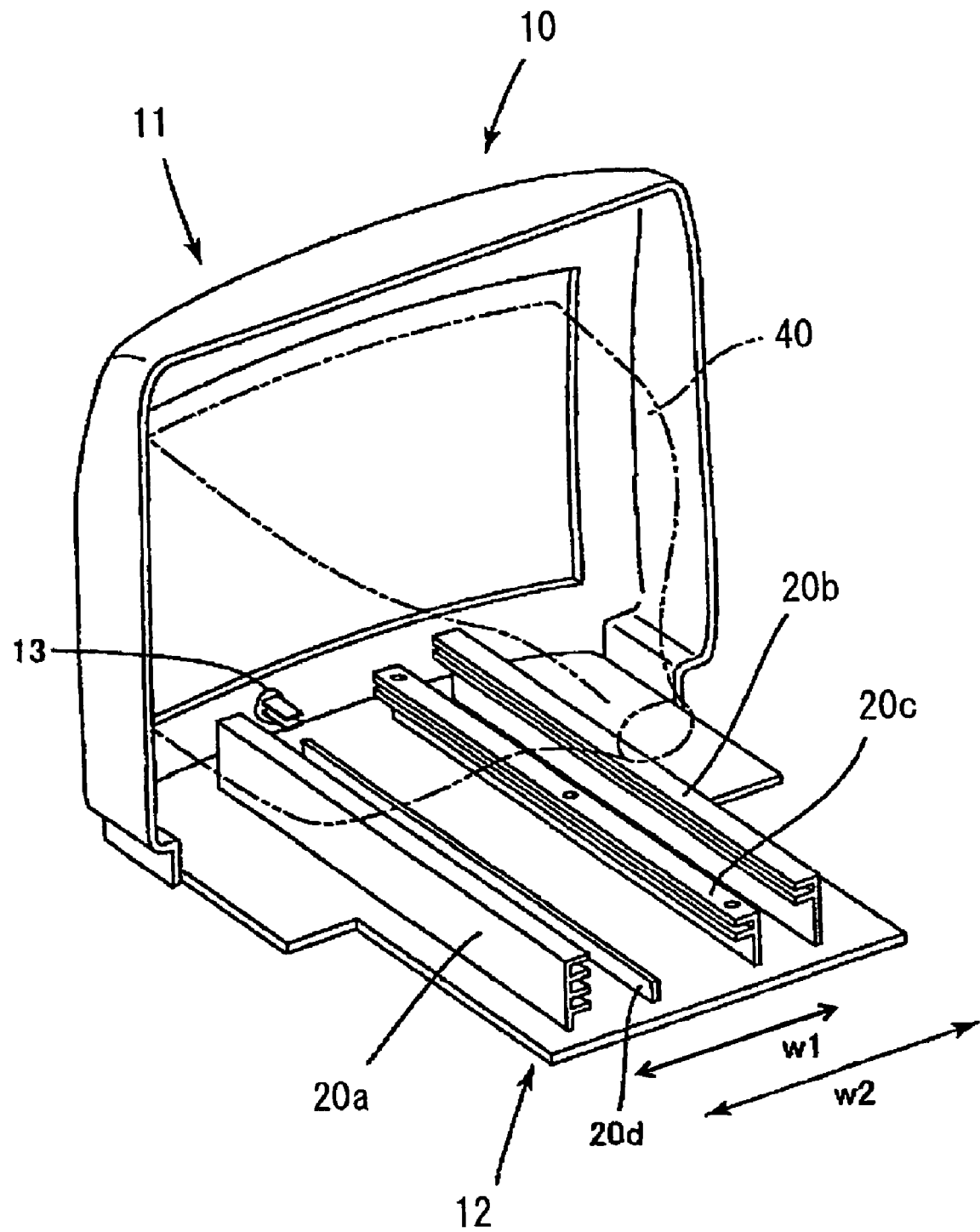
FIG. 2 is a perspective rear view of the cabinet shown in FIG. 1.

Referring to FIG. 2 showing the interior of the cabinet 10 in a perspective view, a substantially plate-shaped bottom wall 12 has a front end perpendicularly joined to the front wall 11. Guide structures 20a, 20b and 20c and a reinforcing rib 20d stand on the bottom wall 12. The body of the image tube 40 is held above the guide structures 20a, 20b and 20c and the reinforcing rib 20d as indicated by two-dot chain lines such that the image tube 40 is spaced from the guide structures 20a, 20b and 20c and the reinforcing rib 20d. The guide structures 20a, 20b and 20c and the reinforcing rib 20d extend perpendicularly to the width of the cabinet 10 from the front end toward the back end of the bottom wall 12.

Figure 3:
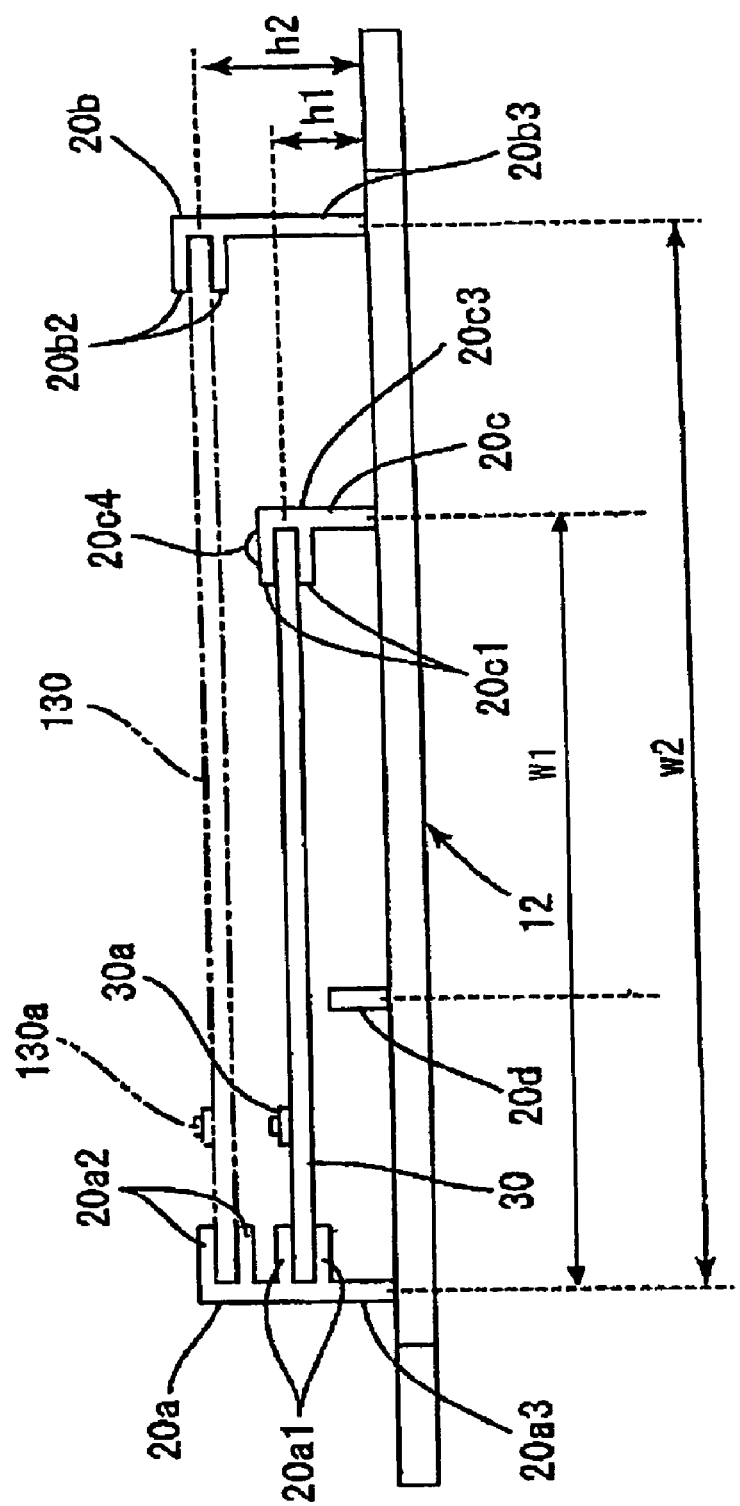
FIG. 3 is a rear view of a bottom wall included in the cabinet shown in FIG. 1.

Referring to FIG. 3, the guide structures 20a, 20b and 20c have ribs 20a3, 20b3 and 20c3, respectively. The ribs 20a3, 20b3 and 20c3 stand on the bottom wall 12 substantially perpendicularly to the bottom wall 12. Substantially U-shaped rails 20a1 and 20a2 are formed in a middle part and an upper end part, respectively, of the rib 20a3. A substantially U-shaped rail 20b2 is formed in an upper end part of the rib 20b3. A substantially U-shaped rail 20c1 is formed in an upper end part of the rib 20c3. The distance between the ribs 20a3 and 20c3 is w1. The respective heights of the rails 20a1 and 20c1 from the bottom wall 12 are h1. Grooves defined by the rails 20a1 and 20c1 open toward each other. The grooves of the rails 20a1 and 20c1 receive opposite side parts of a narrow printed wiring board 30 to hold the narrow printed wiring board 30 by the rails 20a1 and 20c1. The reinforcing rib 20d stands substantially perpendicularly to the bottom wall 12 at substantially middle between the ribs 20a3 and 20c3. The height of the reinforcing rib 20d is lower than that of the narrow printed wiring board 30 by a predetermined vertical distance.

The distance between the ribs 20a3 and 20b3 is w2. The respective heights of the rails 20a2 and 20b2 from the bottom wall 12 are h2 greater than the height h1 of the rail 20c1. Grooves defined by the rails 20a2 and 20b2 open toward each other. The grooves of the rails 20a2 and 20b2 receive opposite side parts of a wide printed wiring board 130 indicated by two-dot chain lines to hold the printed wiring board 130 by the rails 20a2 and 20b2.

In the cabinet 10, the rails 20a1 and 20c1 are able to hold the narrow printed wiring board 30 of a width w1. The rails 20a2 and 20b2 are able to hold the wide printed wiring board 130 of a width w2. Either of the printed wiring boards 30 and 130 can be used without changing the design of the cabinet 10. Suppose that an expensive television set provided with the wide printed wiring board 130 is capable of generating stereophonic sounds and an inexpensive television set provided with the narrow printed wiring board 30 is capable of generating monaural sounds. Then, this cabinet 10 can be used for forming either of the expensive stereophonic television set and the inexpensive monaural television set. Thus the cabinet 10 can be used for the stereophonic television set or the monaural television set by using the wide printed wiring board 130 or the narrow printed wiring board 30.

Both the rail 20a2 for holding the wide printed wiring board 130 and the rail 20a1 for holding the narrow printed wiring board 30 are formed at different levels, respectively, on the rib 20a3. Consequently, the cabinet 10 is simpler in construction than a cabinet provided with the rails 20a2 and 20a1 formed respectively on different ribs.

Operation of the Key Top 13

As mentioned above, the cabinet 10 of the present invention can hold either of the printed wiring boards respectively having different widths. The key top 13 included in the cabinet 10 is able to press the tact switch of either of the printed wiring boards respectively having different widths. As shown in FIG. 3, the narrow printed wiring board 30 provided with a tact switch 30a is held by the rails 20a1 and 20c1 at the height h1, and the wide printed wiring board 130 provided with a tact switch 130a is held by the rails 20a2 and 20b2 at the height h2. Consequently, the tact switches 30a and 130a are at different heights, respectively.

Figure 4:
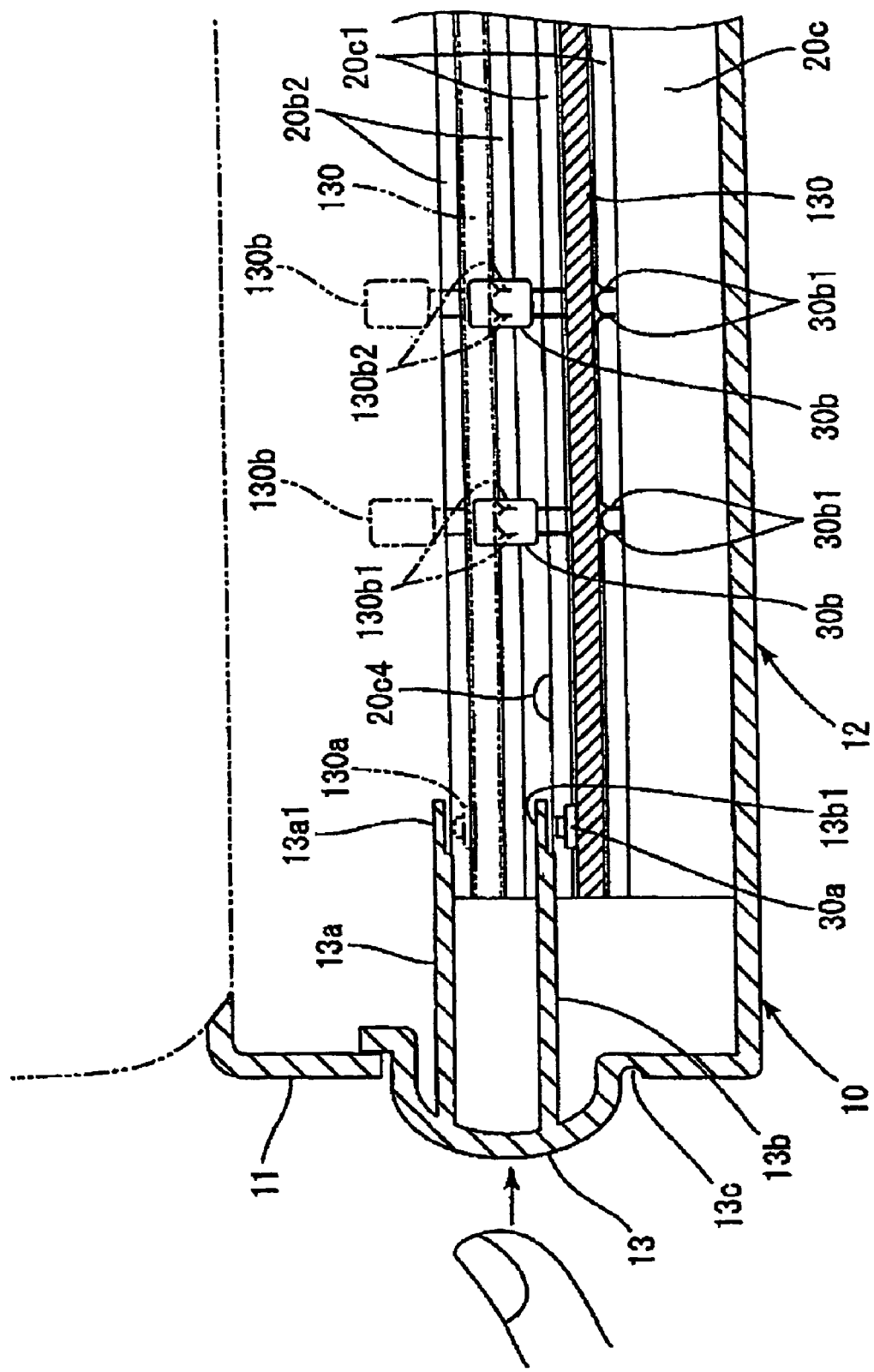
FIG. 4 is a sectional view of a key top included in the cabinet shown in FIG. 1 in an inoperative position.

Referring to FIG. 4 showing the key top 13 in a sectional view, the key top 13 has a forward convex head, and two opposite depressing plates 13a and 13b extending backward from the head and respectively having thin contact parts 13a1 and 13b1 of a predetermined length formed by reducing the thickness of end parts of the depressing plates 13a and 13b. The contact part 13a1 lies above and opposite to the tact switch 130a of the wide printed wiring board 130 indicated by two-dot chain lines.

The contact part 13b1 lies above and opposite to the tact switch 30a of the narrow wiring board 30 indicated by continuous lines. The contact parts 13a1 and 13b1 are spaced a predetermined distance apart from the tact switches 130a and 30a, respectively. The tact switches 30a and 130a are provided with projections of a small diameter. The projections of the tact switches 30a and 130a are depressed to connect the printed wiring boards 30 and 130 to and disconnected the same from a power source. The tact switches 30a and 130a are thin.

Figure 5:
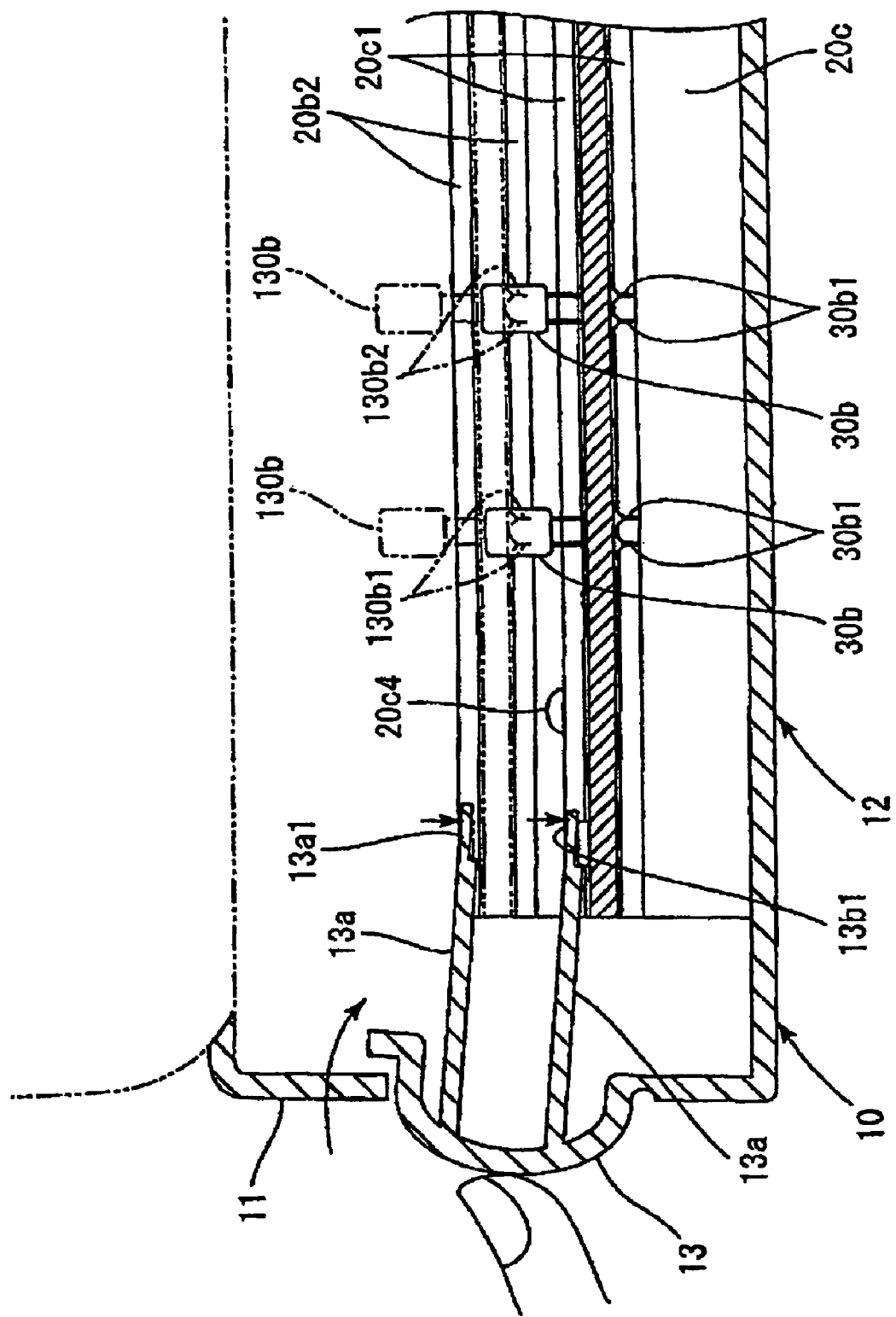
FIG. 5 is a sectional view of the key top included in the cabinet shown in FIG. 1 in an operative position.

The head of the key top 13 has an upper end disconnected from the front wall 11, and a thin lower end 13c merging into the front wall 11. When the key top 13 is pushed backward, the key top 13 turns on the lower end 13c and the contact parts 13a1 and 13b1 of the depressing plates 13a and 13b move downward as shown in FIG. 5.

In this state, the projection of the tact switch 130a opposite the contact part 13a1 is depressed if the wide printed wiring board 130 is held in the cabinet 10 or the projection of the tact switch 30a opposite the contact part 13a2 is depressed if the narrow printed wiring board 30 is held in the cabinet 10.

Thus the key top 13 is capable of depressing the projection of either of the tact switch 30a of the narrow printed wiring board 30 and the tact switch 130a of the wide printed wiring board 130, and hence design of the key top 13 doe not need to be changed when the narrow printed wiring board 30 of the width w1 is replaced with the wide wiring board 130 of the width w2 and vice versa.

Either the printed wiring board 30 or the printed wiring board 130 is held in the cabinet 10. Therefore, although the printed wiring board 30 is provided with capacitors 30b of a height that will interfere with the wide printed wiring board 130 if the printed wiring board 130 is held in the cabinet 10, the printed wiring board 30 can be held in the cabinet 10 without any problem. In most television sets, the image tube is disposed in an upper part of the interior of the cabinet, and only a narrow space is available for placing a printed wiring board in the cabinet. Therefore, it is desirable to reduce the vertical distance between the printed wiring boards 30 and 130 to the shortest possible extent.

If the lower contact part 13b1 interferes with the wide printed wiring board 130, the key top 13 is unable to be tilted normally when the printed wiring board 130 is held in the cabinet 10, and the upper contact part 13a1 is unable to press the tact switch 130a normally. Therefore, the interference of the lower contact part 13b1 with the printed wiring board 130 is impermissible. According to the present invention, the tact switches 30a and 130a are thin, and the contact parts 13a1 and 13b1 facing the tact switches 30a and 130a are thin. Thus, the tact switches 30a and 130a and the contact parts 13a1 and 13b1 which are vertically superposed are thin. Since only the contact parts 13a1 and the 13b1 of the predetermined length of the depressing plates 13a and 13b are thin, the depressing plates 13a and 13b have rigidity sufficient for preventing the unsatisfactory depression of the tact switches 130a and 30a.

The leads of the capacitors 30b and 130b are soldered to wiring lines formed on the lower surfaces of the printed wiring board 30 and 130. The top of the reinforcing rib 20d is at a predetermined distance below the soldered parts 30b1 of the capacitors 30b. Thus, the downward convex warping of the printed wiring board 30 can be prevented when the printed wiring board 30 is depressed suddenly or pressure is applied to the tact switch 30a. Protrusions 20c4 are formed on the guide structure 20s at a predetermined distance below the printed wiring board 130. The guide structure 20c is disposed between the guide structures 20a and 20b holding the printed wiring board 130. Thus, the downward convex warping of the printed wiring board 130 can be prevented when the printed wiring board 130 is depressed suddenly or pressure is applied to the tact switch 130a.

As apparent from the foregoing description, according to the present invention, the cabinet 10 is provided with the guide structures 20a, 20b and 20c for holding the printed wiring boards 30 and 130 respectively having different widths at different heights, respectively. Thus either of the printed wiring board 30 or the printed wiring board 130 can be held in the cabinet 10 without interfering with the guide structures 20a, 20b and 20c. The single key top 13 is able to press the tact switches 30a and 130a of the printed wiring boards 30 and 130. Thus, the cabinet 10 including the key top 13 does not need to change its design even if either the printed wiring board 30 or the printed wiring board 130 is used.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A cabinet for a television set having a picture tube, said cabinet comprising:
   a casing housing the picture tube therein and having a bottom wall, and a front wall provided with an opening through which a display screen included in the picture tube is exposed;
   a key top placed on the front wall at a position below the screen of the picture tube; and
   a printed wiring board holding structure for holding first and second printed wiring boards, each provided with a tact switch capable of being pressed by the key top, in the casing substantially parallel to the bottom wall of the casing, including two first guide structures spaced a first distance apart from each other, and including two rectangular first ribs standing on the bottom wall and extending substantially perpendicularly to a lateral direction, and two substantially U-shaped first rails formed integrally with the two first ribs, respectively, defining first grooves opening toward each other and receiving side parts of the first printed wiring board of a predetermined first width therein and capable of guiding the first printed wiring board and of holding the first printed wiring board at a predetermined first height from the bottom wall, and two second guide structures spaced a second distance apart from each other, and including two rectangular second ribs standing on the bottom wall and extending perpendicularly to the lateral direction, and two substantially U-shaped second rails formed integrally with the second ribs, respectively, defining second grooves opening toward each other and receiving side parts of the second printed wiring board of a predetermined second width therein; and
   a reinforcing rib formed at a position between the two first guide structures to support the first printed wiring board held by the first guide structures thereon;
   wherein one of the two second ribs is formed integrally with one of the two first ribs, the other second rib is formed on the laterally outer side of the other first rib, the second height is higher than the first height, the key top has two opposite depressing plates extending backward, respectively having thin contact parts of a predetermined length formed by reducing the thickness of end parts thereof, facing the thin tact switches of the first and the second printed wiring boards, respectively, and capable of depressing the tact switches when the key top is tilted relative to the front wall.

2. A cabinet for an electric apparatus, comprising:
   a casing having a front wall and a bottom wall;
   a key top placed on the front wall; and
   a printed wiring board holding structure for holding first and second printed wiring boards, each provided with a tact switch capable of being pressed by the key top, substantially parallel to the bottom wall of the casing in the casing, including two first guide structures supporting side parts of the first printed wiring board of a predetermined first width thereon, and capable of guiding the first printed wiring board and of holding the same at a predetermined first height from the bottom wall, and two second guide structures supporting side parts of the second printed wiring board of a predetermined second width thereon at a second height from the bottom wall;
   wherein the key top is capable of pressing the tact switches of the first and the second printed wiring board held by the first and the second guide structure, respectively.

3. The cabinet for an electric apparatus according to claim 2, wherein the key top has two opposite depressing plates extending backward and respectively having contact parts facing the tact switches of the first and the second printed wiring board held respectively by the two first guide structures and the two second guide structures, and is capable of depressing the tact switches when tilted relative to the front wall.

4. The cabinet for an electric apparatus according to claim 3, wherein the contact part of each of the depressing plates is formed by reducing the thickness of an end part of a predetermined length of the depressing plate.

5. The cabinet for an electric apparatus according to claim 2, wherein the tact switches are thin.

6. The cabinet for an electric apparatus according to claim 2, wherein the two first guide structures include two rectangular first ribs standing on the bottom wall and extending substantially perpendicularly to a lateral direction, and two substantially U-shaped first rails formed on the two first ribs, respectively, defining grooves opening toward each other and receiving side parts of the first printed wiring board, and the two second guide structures include two rectangular second ribs standing on the bottom wall and extending perpendicularly to the lateral direction, and two substantially U-shaped second rails formed on the two second ribs, respectively, defining grooves opening toward each other and receiving side parts of the second printed wiring board.

7. The cabinet for an electric apparatus according to claim 6, wherein one of the two second ribs is formed integrally with one of the two first ribs.

8. The cabinet for an electric apparatus according to claim 2, wherein a reinforcing rib is formed between the two first guide structures on the bottom wall to support the first printed wiring board held by the two first guide structures.

9. The cabinet for an electric apparatus according to claim 2, wherein the two first guide structures are provided at their tops with protrusions for supporting the second printed wiring board held by the two second guide structures.

* * * * *